(12) United States Patent
Sze et al.

(10) Patent No.: US 10,126,472 B2
(45) Date of Patent: Nov. 13, 2018

(54) MULTI-BAND SPECTRUM DIVISION DEVICE

(71) Applicant: National Applied Research Laboratories, Taipei (TW)

(72) Inventors: Jyh-Rou Sze, Hsinchu (TW); Po-Jui Chen, Hsinchu (TW); Chun-Fu Lin, Hsinchu (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 0 days.

(21) Appl. No.: 15/256,715

(22) Filed: Sep. 5, 2016

(65) Prior Publication Data
US 2017/0068023 A1 Mar. 9, 2017

(30) Foreign Application Priority Data

Sep. 4, 2015 (TW) .............................. 104129405 A

(51) Int. Cl.
| | |
|---|---|
| *G01J 1/08* | (2006.01) |
| *G02B 5/18* | (2006.01) |
| *G02B 17/00* | (2006.01) |
| *G02B 27/30* | (2006.01) |
| *G02B 27/42* | (2006.01) |
| *G02B 27/10* | (2006.01) |
| *G01J 3/02* | (2006.01) |
| *G01J 3/18* | (2006.01) |

(52) U.S. Cl.
CPC .............. *G02B 5/1861* (2013.01); *G01J 1/08* (2013.01); *G01J 3/021* (2013.01); *G01J 3/0208* (2013.01); *G01J 3/0291* (2013.01); *G01J 3/1804* (2013.01); *G02B 17/008* (2013.01); *G02B 27/1086* (2013.01); *G02B 27/30* (2013.01); *G02B 27/4244* (2013.01)

(58) Field of Classification Search
CPC ...................................... G01J 3/02; G01J 1/08
USPC ...... 359/569, 223.1; 356/308, 305, 328, 334, 356/326
See application file for complete search history.

(56) References Cited

U.S. PATENT DOCUMENTS

| | | | | |
|---|---|---|---|---|
| 5,889,588 A | * | 3/1999 | Santman | G01J 3/02 356/308 |
| 9,091,853 B2 | * | 7/2015 | Longeaud | G01J 1/08 |
| 2004/0057049 A1 | * | 3/2004 | Bruch | G01J 3/02 356/328 |

FOREIGN PATENT DOCUMENTS

| | | |
|---|---|---|
| CN | 201697714 U | 1/2011 |
| CN | 202216909 U | 5/2012 |

* cited by examiner

*Primary Examiner* — Audrey Y Chang
(74) *Attorney, Agent, or Firm* — Cheng-Ju Chiang

(57) ABSTRACT

A multi-band spectrum division device is provided, comprising: a first parabolic reflection mirror, planar multi-mirrors, an optical grating and a second parabolic mirror. The first parabolic mirror is configured to reduce the divergent angle of incident optical beam, and to generate a collimated optical beam. The planar multi-mirrors are configured to adjust the incident angles of collimated beam on the grating surface. The grating is configured to disperse the incident signals with multi-wavelengths. The second parabolic mirror is configured to focus the multi-wavelength signals on its focal plane. Besides, each of the planar multi-mirrors has different location and angle in this device.

7 Claims, 2 Drawing Sheets

MULTI-BAND SPECTRUM DIVISION DEVICE

BACKGROUND OF THE INVENTION

1. Field of the Invention

This invention relates to a spectrum device, especially a multi-band spectrum division device.

2. Description of the Prior Art

Each atomic of material has its own characteristic spectrum. The characteristic spectrum can be used to identify the type and content of substance by spectroscopic analysis, and further confirm its chemical composition. Such as semiconductor material purity, sweetness of fruits and vegetables; disease or food testing, etc., can be confirmed by spectroscopic analysis.

In recent years, due to the technologies of environment pollution detection, food safety detection, lesion determination, and semiconductor material detection are more and more important, in order to detect the variety of the test sample immediately, the real-time multi-band spectrum division device is developed. With the increasing diversity of the test sample, and the sample characteristic differences decreased. In order to effectively discriminate the differences of samples, the high-resolution optical spectrum analyzer is developed on the market. The main grating for detecting with visible light usually is more than 1200 lp/mm. However, the corresponding range of spectrum detecting reduces to less than 180 nm, so that only specific substance can be detected by single spectrum device. If we want to detect the area out of this range, the high precision rotating unit must be added to the single spectrum device, and rotate the diffraction grating to the wave band range needed, then proceed to regulate the spectrum device. However, this device may increase the cost of the system, it cannot be ensured repeatability and institutional stability. In addition, the detecting process is time-consuming and complicated. The spectrum device may lose the real-time detecting ability.

SUMMARY OF THE INVENTION

In view problems, one aspect of this invention is to provide a multi-band spectrum division device, comprising a first parabolic reflection mirror, a plurality of planar reflection mirrors, a grating and a second parabolic reflection mirror. The first parabolic reflection mirror is configured to reduce the divergent angle of incident optical beam and to generate a collimated optical beam. The plurality of planar reflection mirrors are configured to adjust the angle of incidence of the collimated optical beam on the grating. The grating is configured to disperse the incident beams of all spectral bands. The second parabolic reflection mirror is configured to focus the incident beams-on a focal plane. Wherein the plurality of planar reflection mirrors have different locations and angles to make the optical beam has the selected angle of incidence with respect to the grating normal. Changing of the angle of incidence in order to switch the spectrum inspection between different spectral bands can be fast and accurate.

Wherein the first parabolic reflection mirror is configured to reduce the divergent angle of incident optical beam and to generate a collimated optical beam. The divergent angle of the collimated optical beam is between −10°~10°.

Wherein the grating has a plurality of straight notches D, the distance between each adjacent straight notch is between 0.6 μm and 5.0 μm.

In one embodiment, a nth of the plurality of planar reflection mirrors can move into an optical path of the multi-band spectrum division device to reflect the optical beams of all spectral bands, included the nth spectral band to the grating of the multi-band spectrum division device, so that meets the mathematical equation. The grating receives the incident optical beam with central wavelength λn of nth spectral band which has the angle of incidence θn, and then emerges with the same diffraction series m and the predicted diffraction angle θd to meet a mathematical equation D(sin θd−sin θn)=mλn. The nth spectral band consists of continuous wavelengths in spectrum, wherein the central wavelength is λn. The sensing area of detector fills with only the optical beam of nth spectral band. The optical beams of other spectral bands are focused on the outside area of detector. The other spectral bands also consist of continuous wavelengths in spectrum having central wavelength different from λn.

The nth of the plurality of planar reflection mirrors can rotate with an endpoint of itself into an optical beam path of the multi-band spectrum division device to reflect the optical beams of all spectral bands, including the nth spectral band to the grating of the multi-band spectrum division device, and the grating receives the incident optical beam with the central wavelength λn of nth spectral band which has the selected angle of incidence θn, and then emerges with the same diffraction series m and the predicted diffraction angle θd to meet a mathematical equation D(sin θd−sin θn)=mλn, where n is a nature number, the period of grooves of grating is D.

Wherein an nth of the plurality of planar reflection mirrors can rotate or move to leave an optical beam path of the multi-band spectrum division device.

DETAILED DESCRIPTION OF THE PREFERRED EMBODIMENT

Figure 1A:
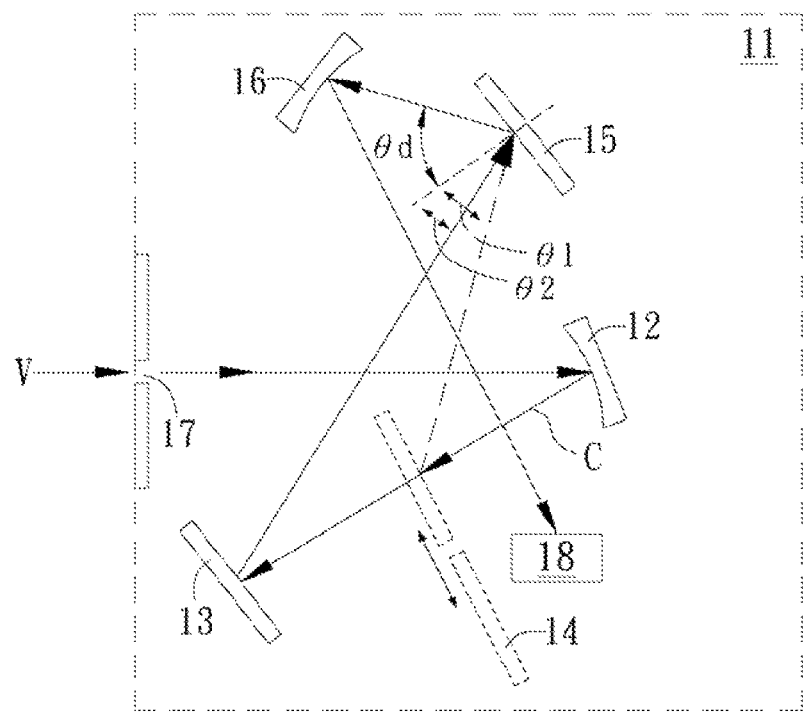
FIG. 1A is a schematic diagram in one embodiment of this invention.

Please refer to FIG. 1A. A multi-band spectrum division device 11 in this embodiment comprising a first parabolic reflection mirror 12, a second planar reflection mirrors 13 for a second wave band, a first planar reflection mirrors 14 for a first wave band, a grating 15, a second parabolic reflection mirror 16, a slit 17, and a processing device 18. An incident optical signal V from a test sample includes two wave bands optical signals. The optical signal V emits into the multi-band spectrum division device 11 through the slit 17. The slit 17 can filter stray light of the optical signal V, so that only the divergent optical beam in narrow range can emit.

The filtered optical signal V emits into the first parabolic reflection mirror 12. The first parabolic reflection mirror 12 collimates the optical signal V into a collimated optical beam C and guides it to the second planar reflection mirrors 13 for a second wave band. In this embodiment, the first parabolic reflection mirror 12 is configured to reduce the divergent angle of collimated optical beam C, wherein the divergent angle is between −10°~10°.

The second planar reflection mirrors 13 for the second wave band reflects the collimated optical beam C to the grating 15. The grating 15 is configured to receive the collimated optical beam C reflected from the second planar reflection mirrors 13 for the second wave band. The grating 15 disperses a second wave band of the collimated optical beam C according to different wavelength. In this embodiment, the grating 15 is a linear grating, but not limited thereto. The grating 15 has a plurality of straight notches (not shown), wherein a distance between each adjacent notches is D. The second wave band of the collimated optical beam C with center wavelength λ2, emits with θ2 angle to the grating 15, and emergent from the grating 15 with θd angle. In this circumstance, this system meets the mathematical equation:

$$D(\sin \theta d - \sin \theta 2) = \lambda 2.$$

The second parabolic reflection mirror 16 focuses the second wave band optical signal with different wavelength reflected from the grating 15 on a position near a focal plane of the second parabolic reflection mirror 16 or the receiving area of the processing device 18. The processing device 18 may be a detector, like a light detector, but not limited thereto. The processing device 18 can determine the proportion percentage of each wavelength of the incident optical beam according to the incident position of the optical beam. In another embodiment, the processing device 18 also can connect with external device (e.g. computer or other similar device) to proceed follow-up analysis or storing.

Still refer to FIG. 1A, the multi-band spectrum division device 11 further comprising a first planar reflection mirror 14 for the first wave band, configured to reflect the collimated optical beam C to the grating 15, like the second planar reflection mirrors 13 for the second wave band. It is noted that, in this embodiment, the locations and angles of the first planar reflection mirror 14 and the second planar reflection mirrors 13 are different. As shown in FIG. 1A, the first planar reflection mirror 14 is disposed between the second planar reflection mirrors 13 and the first parabolic reflection mirror 12. It is noted that the first planar reflection mirror 14 can move or rotate to enter or leave an optical beam path of the multi-band spectrum division device 11. In this embodiment, the first planar reflection mirror 14 can move back and forth on the path which is perpendicular to the collimated optical beam C from the first parabolic reflection mirror 12 to the second planar reflection mirrors 13. The first planar reflection mirror 14 for the first wave band can be connected with a moving device such as motor or the like.

When the first planar reflection mirror 14 enters the path of the collimated optical beam C, the collimated optical beam C is reflected to the grating 15 by the first planar reflection mirror 14. At this time, an optical beam with a first center wavelength λ1 of the collimated optical beam C emits to the grating 15 with θ1 incident angle. In addition, by adjusting the location of the first planar reflection mirror 14, and the relative angle between the first planar reflection mirror 14 and the grating 15, the center wavelength λ1 of the first wave band of the collimated optical beam C will emerge from the grating 15 with the same angle θd. In this circumstance, this system meets the mathematical equation: D(sin θd−sin θ1)=λ1. Similarly, the second parabolic reflection mirror 16 focuses the second wave band optical signal with different wavelength reflected from the grating 15 on a position near a focal plane of the second parabolic reflection mirror 16 or the receiving area of the processing device 18.

As set forth above two circumstances, by adjusting the locations of the first planar reflection mirror 14 or the second planar reflection mirrors 13, and the relative angles between the first planar reflection mirror 14 or the second planar reflection mirrors 13 and the grating 15, it makes the center wavelength λn of the each wave band of the collimated optical beam C emit with different incident angle respectively, and emerge with the same emergent angle of each wave band.

Accordingly, the multi-band spectrum division device 11, in this embodiment, take two-band spectrum division device for example, n is 1 and 2. If it is three-band spectrum division device, n is 1, 2 and 3. That is, the multi-band spectrum division device, n is 1, 2, 3, . . . . The n is a nature number.

Figure 1B:
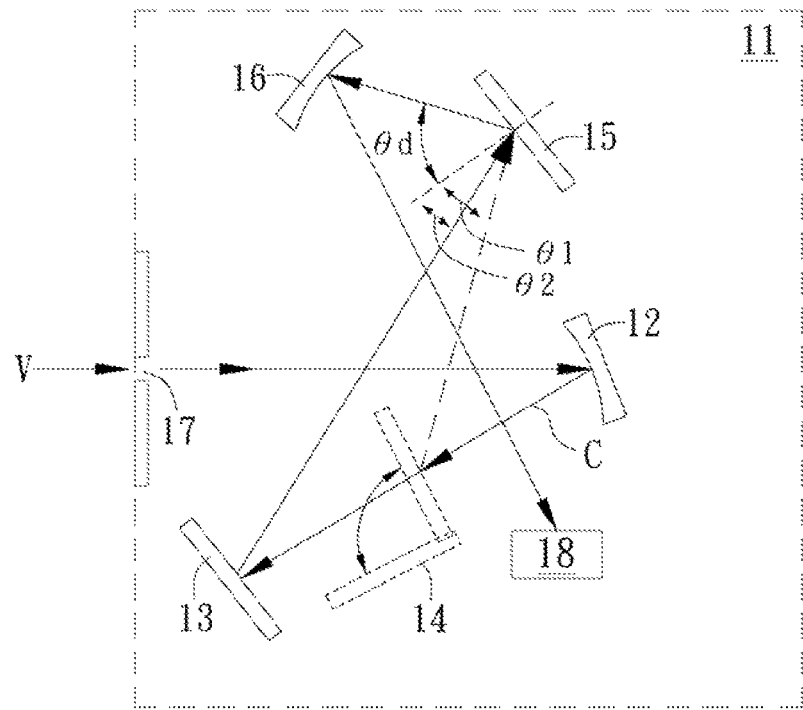
FIG. 1B is a schematic diagram in another embodiment of this invention.

In another embodiment of this invention, as shown in FIG. 1B. The first planar reflection mirror 14 for the first wave band takes an endpoint as a shaft, and rotates with the endpoint to enter the optical beam path of the two-band spectrum division device 11. It is noted that, in this embodiment, the first planar reflection mirror 14 rotates 90° to enter the path, but not limited thereto. The first planar reflection mirror 14 can connect with a rotating device or revolving device to rotate.

Figure 1C:
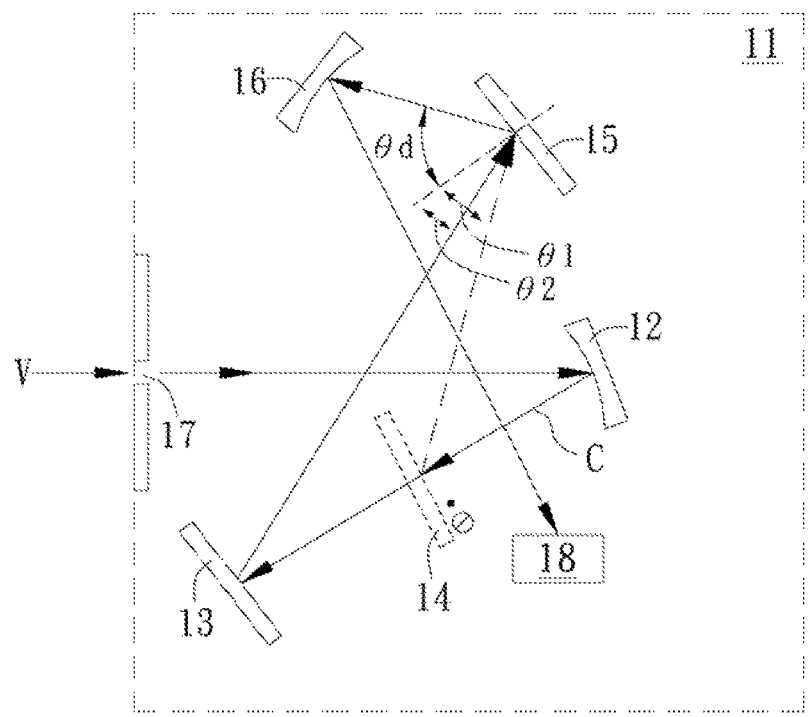
FIG. 1C is a schematic diagram in another embodiment of this invention.

In another embodiment of this invention, as shown in FIG. 1C. The first planar reflection mirror 14 can move up and down to enter or leave the optical beam path of the two-band spectrum division device 11.

Figure 2:
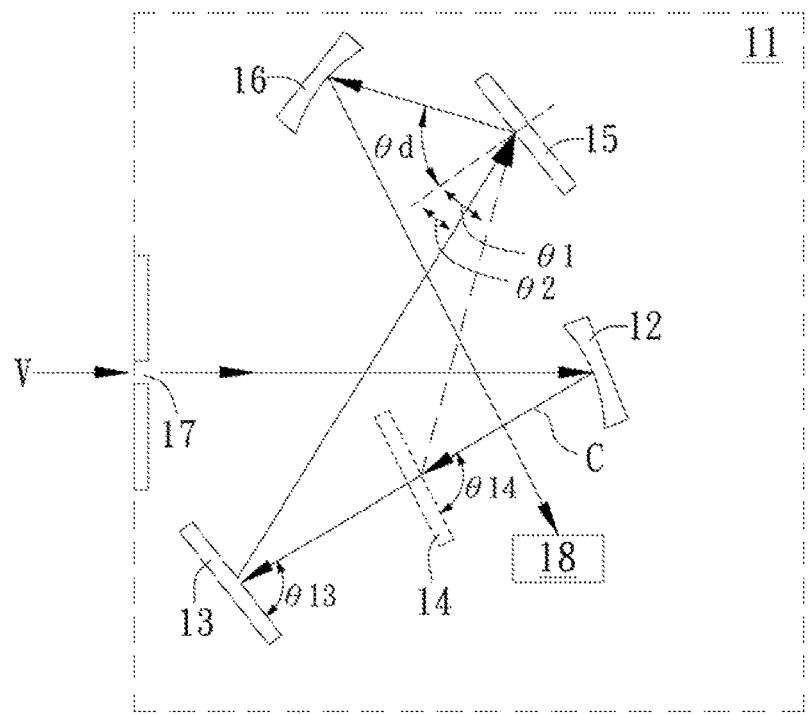
FIG. 2 is a schematic diagram in another embodiment of this invention.

In another embodiment of this invention, using single planar reflection mirror to finish switching two wave band detecting signals, as shown in FIG. 2. The planar reflection mirror 14 and an incident optical beam have an angle θ14. It makes an optical beam with a first center wavelength λ1 of the collimated optical beam C emit to the grating 15 with angle θ1 and meet an mathematical equation D(sin θd−sin θ1)=λ1 to detect the spectrum signal of the first wave band. When detecting the spectrum signal of the second wave band, the planar reflection mirror can move to the location 13, and has an angle θ13 with the incident optical beam. It makes an optical beam with a first center wavelength λ2 of the collimated optical beam C emit to the grating 15 with angle θ2 and meet an mathematical equation D(sin θd−sin θ2)=λ2.

Compared to the prior art, the multi-band spectrum division device in this invention has a relative simple structure. It can reduce the cost and has much wider ranges of detecting wave band in the same resolution.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A multi-band spectrum division device, comprising:
   a first parabolic reflection mirror, configured to reduce the divergent angle of incident optical beam and to generate a collimated optical beam;
   a first planar reflection mirror located at a first location with a first angular orientation with respect to an optical path,
   a second planar reflection mirror located at a second location with a second angular orientation with respect to the optical path, wherein the second reflection mirror may be moved or rotated into or out of the optical beam path, the planar reflection mirrors each is configure to reflect multi-band of the collimated optical beam;

a diffraction grating, configured to receive the reflected multi-band collimated optical beam from the first reflection mirror with a first incident angle when the second planar mirror is moved or rotated out of the optical beam path or to receive the reflected multi-band collimated optical beam from the second reflection mirror with a second incident angle when the second planar mirror is moved or rotated into the optical beam path, the grating is to diffract and disperse the received multi-band collimated optical beam; and a second parabolic reflection mirror, configured to focus the band of optical beam diffracted from the diffraction grating on a focal plane.

2. The multi-band spectrum division device as claimed in claim 1, wherein the diffraction grating has a plurality of straight notches, wherein a distance between each adjacent straight notch is D.

3. The multi-band spectrum division device as claimed in claim 2, wherein the distance D is between 0.6 μm and 5.0 μm.

4. The multi-band spectrum division device as claimed in claim 1, wherein the diffraction grating receives the collimated optical beam at a specific angle of incident $\theta n$, wherein the n is a nature number indicated n-th wavelength band $\Delta_n$, and the diffraction grating divides and diffracts the n-th wavelength band of the collimated optical beam into a specific angle direction $\theta d$, according to the diffraction equation $D(\sin \theta d - \sin \theta n) = m\lambda n$, m being an integer.

5. The multi-band spectrum division device as claimed in claim 4, wherein the first and second planar reflection mirrors can move into the optical beam path of the multi-band spectrum division device to reflect the multi-band of the collimated optical beam to the diffraction grating of the multi-band spectrum division device, so that meets the diffraction equation.

6. The multi-band spectrum division device as claimed in claim 4, wherein the first and second planar reflection mirrors can rotate into the optical beam path of the multi-band spectrum division device to reflect the multi-band of the collimated optical beam to the diffraction grating of the multi-band spectrum division device, so that meets the diffraction equation.

7. The multi-band spectrum division device as claimed in claim 6, wherein the planar reflection mirrors can rotate with an endpoint of itself.

* * * * *